(12) United States Patent
Liisberg

(10) Patent No.: US 10,282,240 B2
(45) Date of Patent: May 7, 2019

(54) MONITORING OF A PROCESSING SYSTEM

(71) Applicant: Robert Bosch GmbH, Stuttgart (DE)

(72) Inventor: Mikkel Liisberg, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 142 days.

(21) Appl. No.: 15/447,495

(22) Filed: Mar. 2, 2017

(65) Prior Publication Data
US 2017/0262325 A1 Sep. 14, 2017

(30) Foreign Application Priority Data
Mar. 10, 2016 (DE) .................. 10 2016 203 965

(51) Int. Cl.
G06F 9/54 (2006.01)
G06F 11/14 (2006.01)
G06F 11/30 (2006.01)
G06F 11/34 (2006.01)
G06F 9/48 (2006.01)

(52) U.S. Cl.
CPC ............. *G06F 9/546* (2013.01); *G06F 9/485* (2013.01); *G06F 11/1441* (2013.01); *G06F 11/3024* (2013.01); *G06F 11/3055* (2013.01); *G06F 11/3495* (2013.01); *G06F 2201/805* (2013.01); *G06F 2209/483* (2013.01); *G06F 2209/485* (2013.01)

(58) Field of Classification Search
CPC ........................................................ G06F 9/546
USPC ............. 714/15, 16, 20, 47.1, 47.2, 47.3, 48
See application file for complete search history.

(56) References Cited

U.S. PATENT DOCUMENTS

| | | | | |
|---|---|---|---|---|
| 2009/0157936 A1* | 6/2009 | Goss | ..................... | G06F 1/3203 710/264 |
| 2011/0019562 A1* | 1/2011 | Cattuto | ................. | G01S 5/0252 370/252 |
| 2011/0296250 A1* | 12/2011 | Calsyn | .................. | G06F 11/362 714/46 |
| 2015/0081879 A1* | 3/2015 | Branson | .............. | H04L 49/9084 709/224 |
| 2018/0150292 A1* | 5/2018 | Linn | ......................... | G06F 9/00 |

* cited by examiner

*Primary Examiner* — Dieu Minh T Le
(74) *Attorney, Agent, or Firm* — Norton Rose Fulbright US LLP; Gerard Messina

(57) ABSTRACT

A processing system is configured to dynamically carry out processes. A method for monitoring the processing system includes steps of determining a number of processes running on the processing system; of determining a maximum expected number of processes; of determining that more processes than expected are running; and of deactivating the processing system.

11 Claims, 3 Drawing Sheets

MONITORING OF A PROCESSING SYSTEM

CROSS REFERENCE

The present application claims the benefit under 35 U.S.C. § 119 of German patent Application No. DE 102016203965.2 filed on Mar. 10, 2016, which is expressly incorporated herein by reference in its entirety.

FIELD

The present invention relates to the monitoring of a processing system. The present invention relates, in particular, to the monitoring of a processing system, which is configured to dynamically carry out processes.

BACKGROUND INFORMATION

In a safety-related application, for example, on board a motor vehicle, a control task is normally processed with the aid of a processing system, which is configured exclusively to carry out static processes. Which processes and how many processes run on the processing system is usually decided at the point in time programs are prepared, which implement the processes. In addition, attention is usually paid to the fact that software of different processes are not used repeatedly. This means that no functionality is provided in repeatedly used libraries, for example. In this way, it may be ensured that the processes are carried out separately from one another and in a preferably fail-safe manner. In particular, a process may be prevented from presenting problems for another process. Such a processing system normally includes a real-time operating system such as OSEK-OS.

However, such a static system is poorly suited for also supporting a functionality of a third-party provider. A processing system may therefore be used, which is configured to dynamically carry out processes, and which includes an operating system such as, for example, Linux. The problem with this may be, however, that one process adversely affects another process or many processes in that it may require so much processing capacity that an important process cannot be reliably carried out.

An object of the present invention is to provide a technique for monitoring a processing system, which provides an improved protection from processes that are unexpectedly carried out. Example embodiments of the present invention are described herein.

SUMMARY

A processing system is configured to dynamically carry out processes. A method for monitoring the processing system includes the steps of determining a number of processes running on the processing system; of determining a maximum expected number of processes; of determining that more processes than expected are running; and of deactivating the processing system.

The processing system may include a normal programmable computer system, which may be situated, for example, on board a motor vehicle. The computer system may include one or multiple processors, each having one or multiple processing units, one or multiple communication interfaces and one or multiple memories. In other words, the computer system may be constructed in the conventional manner, centrally or decentrally. As a result of its suitability for carrying out dynamic processes, new processes may be started or existing processes may be terminated during runtime. By monitoring an expected maximum number of processes, it is possible to immediately respond when an additional, redundant process is started. This process may be generally harmful or, together with the expected processes, increase the load of an implementing hardware (computer system) to the extent that the implementation reliability of one or multiple processes is endangered.

The determination of the number of processes running on the processing system may be simply carried out; many operating systems offer an interface or even a finished tool for this purpose. In a Unix operating system, this may be, in particular, the system program ps ("process status").

With the deactivation, the processing system is able to adhere to the principle of the "silent fail" by preventing the output of potentially false information, determinations, computations or control signals by one of the processes when an error becomes known. The operation of the processing system is immediately halted, in order to prevent further damage from being caused by false results.

In another preferred specific embodiment, system rights of the running processes are determined, the determined system rights are compared to predetermined system rights, it is determined that one of the running processes has obtained extended system rights and the processing system is deactivated.

The system rights may be simply determined in a corresponding manner similar to the number of running processes on the processing system. The system program ps may be used, for example, to learn to which memory areas an indicated process has write access. If this information coincides with a predetermined system right, for example, with an inventory of memory parts legally writable by the process, the processing system may then also be deactivated.

Deactivation may take place in different ways. In a first variant, the deactivation includes the resetting of the processing system. As a result, all running processes are terminated and may be restarted when the processing system is subsequently booted up again. In this way, an erroneously started process or a process, which has obtained extended system rights, may be rendered harmless.

The resetting may include the carrying out of a software reset request. In other words, the method may transmit a processing signal, which is received, for example, by an operating system of the processing system and which causes the processing system to be reset. The resetting of the processing system by software may advantageously preclude the use of additional hardware, as a result of which costs may be reduced in the manufacture and operation of the processing system. In another specific embodiment, a resetting request may also be effectuated in the hardware, as described in greater detail below.

The processing system may include a processing device and a monitoring circuit, the deactivation being controlled by the monitoring circuit. This may increase the reliability with which the resetting of the processing system is triggered.

In general, it is preferred that the method is carried out periodically. In this way, the integrity of the processing system may be continuously ensured.

The aforementioned monitoring circuit may include, in particular, a "watchdog timer" which, when running, deactivates the processing system, the timer being set to a predetermined value, if the processing system is not to be deactivated. In this way, the watchdog timer may reliably ensure a resetting of the processing system if, for example, the above described method fails as a result of an error in one of the processes, for example, because the number of running processes or system rights of the running processes cannot be determined.

In another variant, the processing system includes a communication interface, the deactivation including a switching-off of the communication interface. In this way, with the aid of a message via the communication interface, one of the processes may be immediately prevented from causing an undesirable external effect. By switching off the communication interface, one part of the processing system may be de facto deactivated without rendering other parts of the processing system inoperative.

In another specific embodiment, multiple lightweight processes (threads) are assigned to one of the processes, the processing system being deactivated if a number of threads exceeds an expected maximum number.

In this way, one process may be prevented from starting more threads than intended. This prevents more threads from being started than may be tolerated for a reliable operation of the processing system.

In general, a thread differs from a process in that multiple threads belonging to the same process may have mutual access to variables or memory areas, without having to actively request a specific mechanism for inter-process communication, such as a semaphore or a repeatedly used memory area.

A computer program product includes program code for carrying out the above described method, when the computer program product runs on a processing device, in particular, the processing system, or is stored on a computer-readable data medium.

A processing system is configured to carry out dynamic processes and the above described method. As a result, the processing system may be used on the one hand to carry out dynamic processes, which may be implemented, for example by a third-party provider and, on the other hand to improve and to ensure the implementation reliability of an ongoing process.

BRIEF DESCRIPTION OF THE DRAWINGS

The present invention is described in greater detail below with reference to the figures.

DETAILED DESCRIPTION OF EXAMPLE EMBODIMENTS

Figure 1:
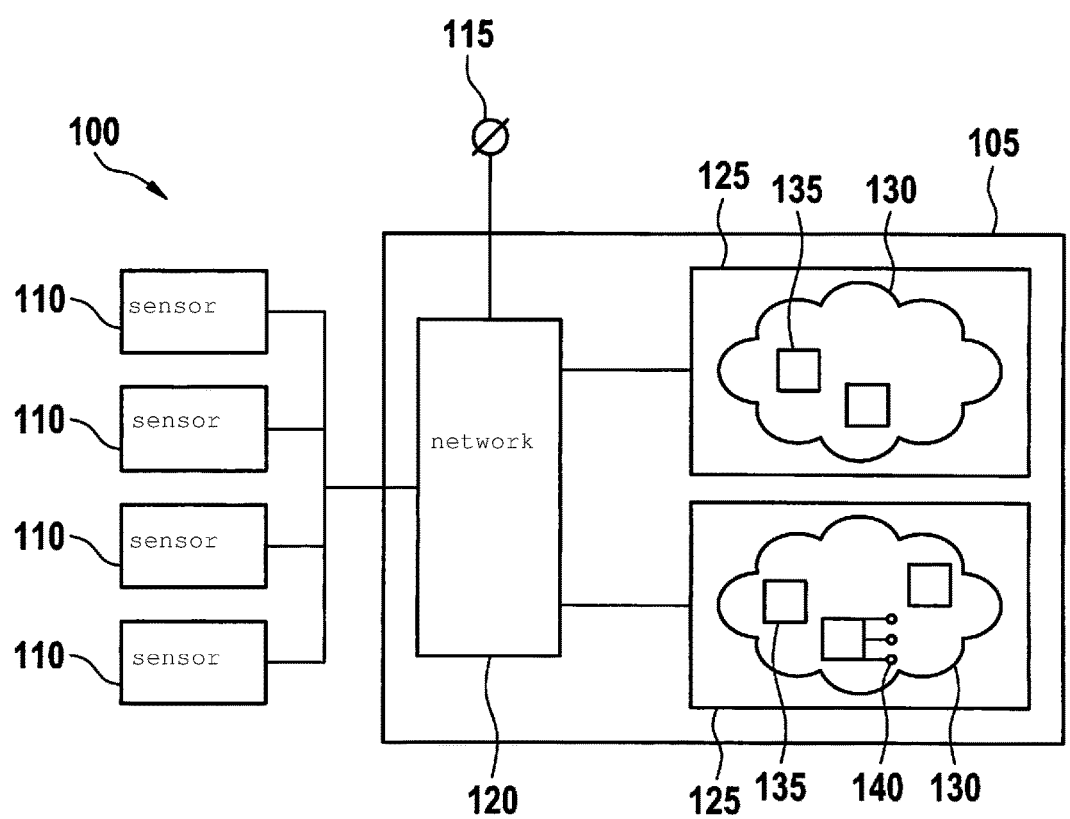
FIG. 1 shows a processing system, in particular, for use on board a motor vehicle.

FIG. 1 shows a processing system 100, in particular, for application on board a motor vehicle. Processing system 100 is configured to carry out a control task on board the motor vehicle. Processing system 100 preferably includes a control unit 105, which is preferably connected to one or multiple sensors 110, and further preferably includes a communication interface 115 for communication with another unit, such as an additional control unit 105 or with a user interface. The communication with communication interface 115 and/or sensors 110 may take place, for example, with the aid of a network 120. As the implementing unit, control unit 105 includes one or multiple processing units 125, each of which may be implemented by a programmable microcomputer or a CPU having one or multiple cores. An operating system 130 preferably runs on each processing unit 125, whereby one operating system 130 may also span multiple processing units 125.

Processing system 100 is configured to dynamically carry out processes 135. Processes 135 may be dynamically started and terminated, whereby the starting may take place through the operating system 130, through another process 135 or on the basis of, for example, a chronological event. Each process 135 may include one or multiple lightweight processes (threads) 140. In this case, all threads 140 of a process 135 normally run as user threads in the same environment and with the same operating means that are assigned to higher-level process 135.

A process 135 may carry out, in particular, a control task, whereby a surroundings variable may be scanned with the aid of a sensor 110, the result may be processed and an actuator, which normally directly or indirectly retroacts on sensor 110, may be actuated with the aid of communication interface 115.

In order to enable processes 135 to be carried out on processing system 100, which were not yet known at a point in time of the conception of processing system 100, have changed since the conception (refined) or were only later installed on processing system 100, it is provided not only to use an operating system 130, which allows dynamic processes 135 to be carried out, but also to ensure that an excessive number of processes 135 does not run on processing system 100.

Figure 2:
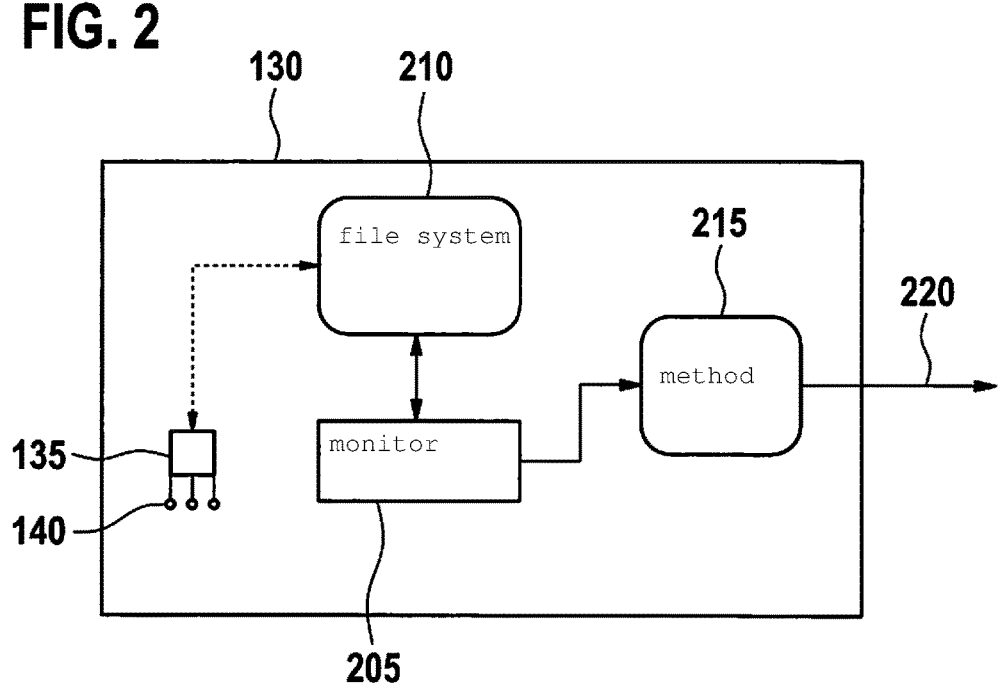
FIG. 2 schematically shows a representation of a process, which runs on a processing system in an operating system.

FIG. 2 schematically shows a representation of a process 135, which runs on a processing system 100 such as that of FIG. 1 in an operating system 130. Operating system 130 provides a monitoring function 205, which is configured to supply information about processes 135, which run or are ready to run on processing system 100. In a Unix-like operating system 130, monitoring function 205 may include, for example, the system program ps, which may query the desired information from a file system 210 of operating system 130. Under Unix, a process 135 exhibits properties of a file, which may be managed via file system 210. Another mechanism may be used in other operating systems 130.

It is provided to use monitoring function 205 to obtain and to analyze information about running processes 135 or threads 140 with the aid of a method 215. If an anomaly is detected in the process, a measure may be initiated, which may include sending a signal 220, which ensures that preferably all processes 135 running on processing system 100 are preferably immediately terminated, inhibited or their communication, in particular, to an actuator, is disrupted.

Figure 3:
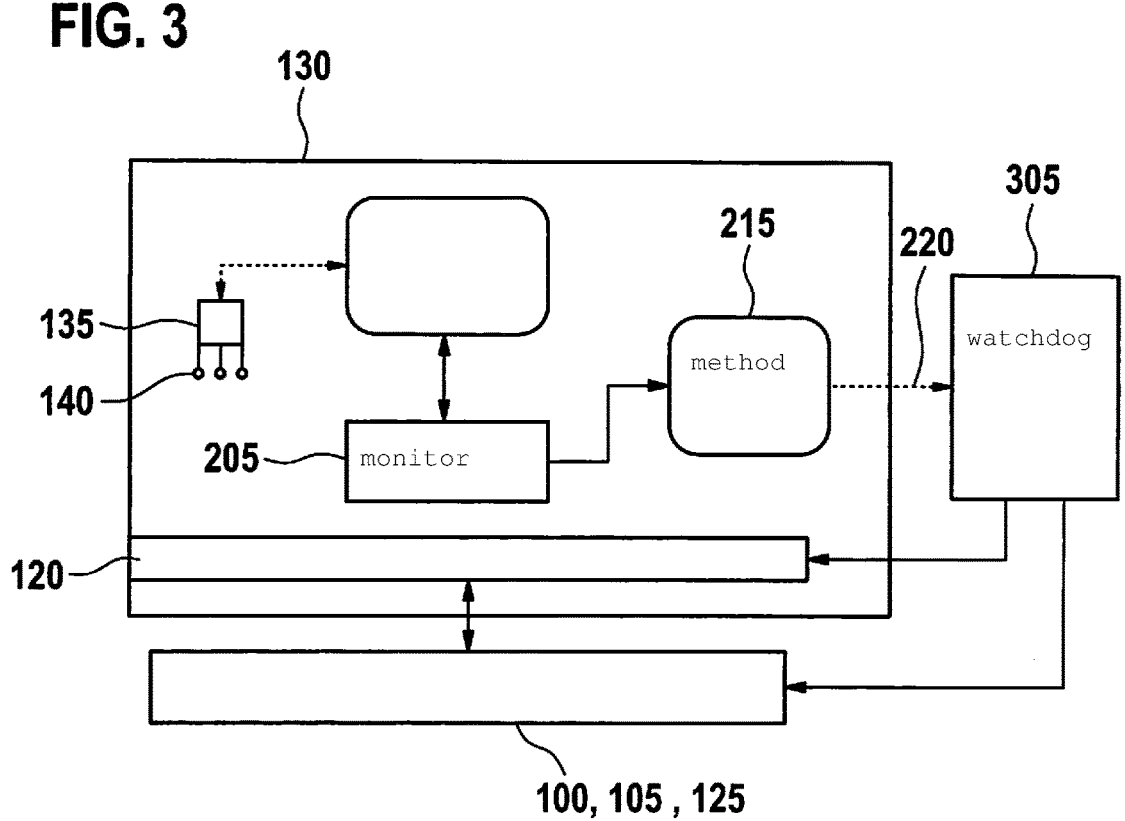
FIG. 3 schematically shows a representation of a processing system including an external watchdog timer.

FIG. 3 schematically shows a representation of a processing system 100 including a watchdog timer ("watchdog") 305. If it is determined by method 215 that an irregularity is present in one of processes 135 or in one of threads 140, an internal action may then be carried out, which is purely software-based, or an external action, which requires watchdog timer 305. Both actions may include the output of a signal 220, in order to either reset processing system 100, or, with the aid of communication interface 115, to cause a disruption of a communication. If watchdog timer 305 is not used, then the resetting or blocking of communication interface 115 may be triggered via method 215 itself or via operating system 130.

On the other hand, both functionalities may also be effectuated independently of one another via watchdog timer 305. In this case, it is of particular advantage that watchdog timer 305 may be activated to initiate the described measure if a complementary signal 220, which indicates that no anomaly was detected, is absent for longer than a predetermined period. Method 215 is carried out preferably periodically, and whenever no anomaly has been determined, watchdog timer 305 is set to a time which corresponds to or exceeds the period duration of the implementation of method 215. Method 215 may be carried out every second, for example, and watchdog timer 305 may be set to a runtime of 1 second whenever no anomaly has been detected. If method 215 cannot be carried out, for example, because its implementation takes longer than one second, or important system resources of processing system 100 are not available, watchdog timer 305 then runs and causes the disruption of communication via communication interface 115 or a resetting of processing system 100 or of control unit 105 or even of just one of processing units 125.

Figure 4:
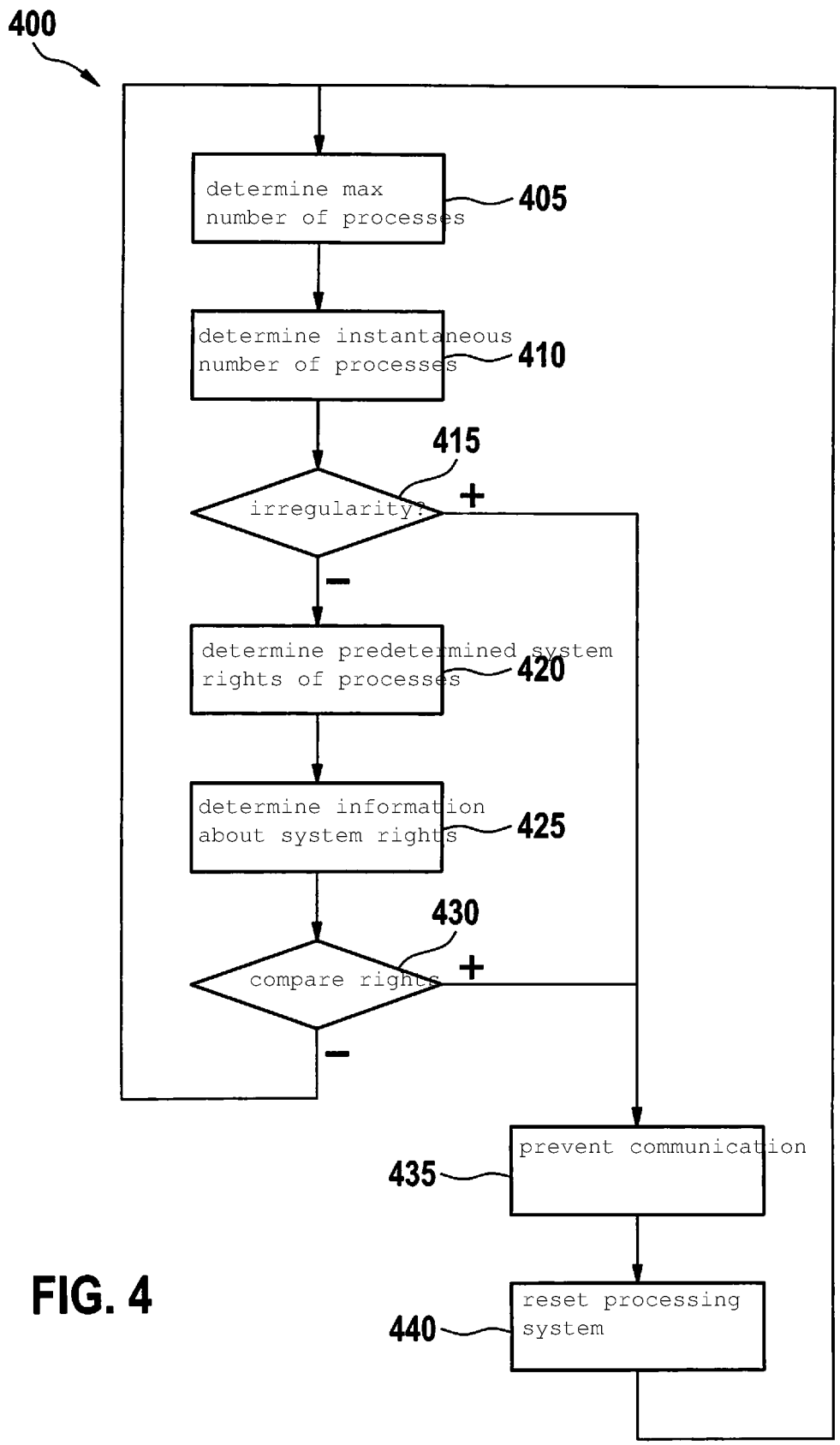
FIG. 4 shows a flow chart of a method for controlling a processing system.

FIG. 4 shows a flow chart of a method 400 for controlling a processing system 100, such as that of one of the preceding figures. Method 400 may, in particular, correspond to method 215 of FIG. 2. In the following description, a number of processes 135 is assumed, method 400 in this case is also correspondingly suitable for threads 140. Method 400 is carried out preferably periodically, for example, controlled by a timer.

In a first step 405, a maximum number of processes 135 is determined, of which it is expected that they run (simultaneously) on processing system 100. This maximum number may be permanently predefined and, for example, changed only if a new process 135 is installed or upgraded on processing system 100. In another specific embodiment, by sending a corresponding message to operating system 130 before the start of a process 135, the maximum number of processes 135 may also be dynamic in order to adapt the maximum number of processes 135 accordingly.

In a step 410, the instantaneous number of processes 135 is determined. For this purpose, monitoring function 205, in particular, may be used. In another specific embodiment, additional information may also be queried via processes 135, in particular, the present system authorizations of running processes 135.

In a step 415, the information obtained is then examined as to whether an irregularity is present. It may be checked, in particular, whether the instantaneous number of processes 135 exceeds the determined maximum number of processes 135. If this is the case, method 400 may continue with a step 435, which is described below in greater detail.

Otherwise, predetermined system rights of one or multiple processes 135 may be determined in a step 420. In a step 425, information about system rights of processes 135 on processing system 100 may then be determined, similar to step 410. In a step 430, the predetermined and the actual system rights are compared with one another and step 435 may be activated if the actual system rights of a process 135 exceed the predetermined system rights. Otherwise, method 400 may return to and undergo step 405 again.

In step 435, a communication with the aid of communication interface 115 is optionally prevented. For this purpose, communication interface 115 may be switched off or a part of operating system 130 required for using communication interface 115 may refuse access.

In addition or alternatively, a resetting of processing system 100 may be prompted in a step 440. Steps 435 and 440 may be prompted, independently of one another, in each case via software or via hardware, in particular, with the aid of watchdog timer 305, as explained above.

What is claimed is:

1. A method for monitoring a processing system which is configured to dynamically carry out processes on board a vehicle, the method comprising:
    determining a number of processes running on the processing system, wherein the processing system includes a control unit having a processing unit, and wherein an operating system runs on the processing unit of the control unit, wherein the operating system provides a monitoring function which determines the number of processes running on the processing system;
    providing a predefined number of a maximum expected number of processes, wherein the predefined number is only changed if a new process is installed or upgraded on the processing system;
    determining, via the processing unit of the control unit, that more processes than expected are running; and
    deactivating, via the processing unit of the control unit, the processing system.

2. The method as recited in claim 1, further comprising:
    determining system rights of the running processes;
    comparing the determined system rights with predetermined system rights;
    determining that one of the running processes has obtained extended system rights; and
    deactivating processing system.

3. The method as recited in claim 1, wherein the deactivation includes the resetting of the processing system.

4. The method as recited in claim 3, wherein the resetting includes carrying out a software resetting request.

5. The method as recited in claim 3, wherein the processing system includes a processing unit and a monitoring circuit, and the deactivation is controlled by the monitoring circuit.

6. The method as recited in claim 1, wherein the method is carried out periodically.

7. The method as recited in claim 5, wherein the monitoring circuit includes a watchdog timer, which, when running, deactivates the processing system, the timer being set to a predetermined value if the processing system is not to be deactivated.

8. The method as recited in claim 1, wherein the processing system includes a communication interface, and the deactivation includes a switching-off of the communication interface.

9. The method as recited in claim 1, wherein one of the processes is assigned multiple lightweight processes and the processing system is deactivated if a number of lightweight processes exceeds an expected maximum number of lightweight processes.

10. A non-transitory computer readable storage medium on which is stored program code, which is executable by a processing unit, comprising:
    a program code arrangement having program code for monitoring a processing system which is configured to dynamically carry out processes on board a vehicle, by performing the following:
    determining a number of processes running on the processing system, wherein the processing system includes a control unit having the processing unit, and wherein an operating system runs on the processing unit of the control unit, wherein the operating system provides a monitoring function which determines the number of processes running on the processing system;

providing a predefined number of a maximum expected number of processes, wherein the predefined number is only changed if a new process is installed or upgraded on the processing system;

determining, via the processing unit of the control unit, that more processes than expected are running; and deactivating, via the processing unit of the control unit, the processing system.

11. A processing system, comprising:

a control unit having a processing unit, wherein an operating system runs on the processing unit of the control unit, wherein the operating system provides a monitoring function which determines the number of processes running on the processing system;

wherein the processing unit provides a predefined number of a maximum expected number of processes, wherein the predefined number is only changed if a new process is installed or upgraded on the processing system, wherein the processing unit of the control unit is configured to determine whether more processes than expected are running; and wherein the processing unit of the control unit is configured to deactivate the processing system.

* * * * *